United States Patent [19]

Fuller, Jr.

[11] Patent Number: 4,654,222

[45] Date of Patent: Mar. 31, 1987

[54] DRIED FRUIT PRODUCT

[75] Inventor: John F. Fuller, Jr., Verona, Pa.

[73] Assignee: H. J. Heinz Company, Pittsburgh, Pa.

[21] Appl. No.: 834,662

[22] Filed: Feb. 28, 1986

Related U.S. Application Data

[63] Continuation of Ser. No. 554,588, Nov. 23, 1983, which is a continuation-in-part of Ser. No. 180,470, Aug. 22, 1980, Pat. No. 4,417,405.

[51] Int. Cl.$^4$ .................. A23B 7/02; A23L 1/212
[52] U.S. Cl. .................... 426/640; 426/457; 426/464; 426/473
[58] Field of Search ............. 426/640, 615, 457, 464, 426/473

[56] References Cited

U.S. PATENT DOCUMENTS

| | | | |
|---|---|---|---|
| 1,908,489 | 5/1933 | Sartakoff | 426/615 |
| 2,123,134 | 7/1938 | Cowgill | 426/465 |
| 2,140,788 | 12/1938 | Cowgill | 426/573 |
| 3,197,312 | 7/1965 | Eolkin | 426/573 |
| 3,384,496 | 5/1968 | Robinson et al. | 426/640 |
| 4,055,675 | 10/1977 | Popper et al. | 426/640 |
| 4,417,405 | 11/1983 | Fuller, Jr. | 426/640 |

OTHER PUBLICATIONS

Farmer, Fannie; Perkins Ed., *The Boston Cooking-School Cook Book*, 9th ed., Little, Brown & Co., ©1951, p. 516.

*Primary Examiner*—Thomas G. Wiseman
*Assistant Examiner*—E. C. Weimar
*Attorney, Agent, or Firm*—Paul & Paul

[57] ABSTRACT

An article of manufacture and process for making same are provided wherein selected fresh fruit or mixtures thereof may be peeled and/or cored, then made into a puree in a manner which preserves the fruits natural integrity, the peels being comminuted and optionally the core materials being further processed and finished whereafter from about 3 to 8% of the comminuted peels and optionally up to about 11% of the comminuted peels together with the processed core materials by wet weight is dried preferably under controlled atmospheric conditions, to produce a dried product having resistance to thermal set, shelf stability being readily reconstitutable to natural consistency and which does not contain any extraneous extenders, inorganic additives, or other unnatural or undesirable additives.

5 Claims, No Drawings

DRIED FRUIT PRODUCT

This application is a continuation of application Ser. No. 06/554,588, filed Nov. 23, 1983, which is a C-I-P of applicant's co-pending application U.S. Ser. No. 180,470, filed Aug. 22, 1980, U.S. Pat. No. 4,417,405 issued Nov. 29, 1983, hereinafter referred to as the "'405 patented process".

BACKGROUND OF THE INVENTION

The present invention is directed to a novel article of manufacture made from natural fruits and a novel process for the dehydration drying of fruits. More particularly, a novel, readily reconstitutable, free flowing flaked product having improved temperature stability, and shelf life properties produced naturally from fresh fruits and their mixtures.

The product of this invention is a shelf stable natural dried fruit product, resistant to thermal set which product is free from extenders, binders, whiteners, inorganics, and other additives heretofore utilized with and thought to be required in producing same in conjunction with continuous processing.

This invention also has application to the production of other products and processes into which the dried fruit product hereof and the process for making same may be incorporated, such as fruit flavored cereals and the like.

When referring to flaked product of the present invention, it will be recognized that the term flakes encompasses a free flowing solid material having improved stability under high temperature conditions which can readily be spooned from a jar or container, is not prone to irreversible lumping in a sealed container, and readily becomes free flowing with agitation or stirring even after the container is initially open to atmosphere. No specific particle size is implied by the term "flake", however the process of this invention permits flakes to have a large particle size without sacrificing the foregoing properties. The term "reconstitutable" is used herein relates to mixing the flaked fruit product with a liquid of various temperatures ranging from hot to cold, including various liquids such as, e.g., water or milk to form a reconstituted product. The term "readily reconstitutable to natural consistency" is meant to include a virtually instantaneously reconstitutable product varying in viscosity, as desired, and which may be reconstituted back to the natural condition of the puree of natural integrity prior to its dehydration; additionally, the product is one in which the viscosity may be adjusted even after the product has been initially constituted.

Fresh fruit products such as applesauce and the like typically contain large percentages of water. This high water content places a heavy burden on the packaging, handling, storing and shipping of such products and has thus stimulated the development of many processes for the dehydration of fruit products. These processes, however, have not satisfied the need for a natural dried fruit product since they require the addition of extenders and/or additives to permit them to be commercially dried in a continuous manner. Moreover they do not form a readily reconstituable free flowing flaked product, which is free from undesirable additives.

Acceptable modes of commercially producing a dehydrated flaked product utilize a drum drier, spray drier, tunnel dryer and the like to form a continuum of dry product. Prior to applicant's discoveries these modes required additions of extenders, binders, gels, gums, inorganic additives, whiteners, and/or other additives to achieve the continuous formation of dry product as a continuous sheet, particle and/or mat or web of dry fruit product. One of the inherent disadvantages of such processes is that the additives remain in the final product and therefore, the product is undesirable as a natural food. For example, the additives are in most cases inorganic substances, or carbohydrates or proteinaceous materials which deleteriously affect the reconstitution properties of the product or dilute the product's flavor, desired nutritional value, consumer acceptability, or the like.

Moreover, many of the prior art processes, while claiming to produce a satisfactory product, generally treat the puree in such a manner which destroys the natural integrity of the fruit, either mechanically, thermally, or chemically, and does not retain the naturally occurring constituents or integrity of the fruit. While the term "extenders" is generally understood to encompass additives made to the puree for purposes of forming a continuum of dry product, it will be understood that this term shall further encompass additives which may aid in forming and/or releasing the puree from the drying mechanism or otherwise permit a natural fruit puree to be continuously dried, processed, and the like, and may include for example, binders, gels, gums, polysaccharides, inorganic additives, whiteners, and extenders as may be known and utilized in the art recognized manner.

Prior to the '405 patented process, the prior art processes therefore did not produce a natural unadulterated fruit product, which reconstituted to a natural fruit food of natural consistency without containing any added starches, saccharides, binders, extenders, inorganic additives, whiteners, or other additives including sulfites, bisulfites and the like which deleteriously effect the natural form of the fruit, its nutritional value, taste, color or the like.

Prior to the present invention, such an unadulterated fruit product did not have high temperature stability and was not resistant to thermal set. Moreover the present invention permits the formation of a continuum of dry product by utilizing a portion of the naturally occurring fibers to aid in the formation of the dry continuum.

SUMMARY OF THE INVENTION

It is therefore an object of the present invention to cure the aforementioned disadvantages of the prior art.

Another object is to provide a novel process which produces a novel free flowing readily reconstitutable, thermal set resitant, shelf stable, flaked fruit product.

These objects and others will be apparent to one skilled in the art from a thorough reading of this specification, the materials incorporated by reference herein, the examples and appended claims.

These objects are accomplished by a process which comprises making a fruit puree which may further be pulped, milled and/or finished all in a manner which retains the natural integrity of the fruit. The puree to be dried may be further defined in that it comprises the following composition (dry weight basis except where otherwise indicated): feed solids ranging from 13 to 22 percent and more preferably between 18 and 22 percent, (wet weight basis); insoluble solids ranging from between about 6.0 to 14.0 percent; a ratio of total sugar to insoluble solids of between about 5:1 to 13:1 and more preferably from about 5:1 to 7:1; total sugars comprising less than about 80 percent and more preferably less than about 75 percent; and a ratio of total sugars to fructose of between about 1.5:1 to 6.0:1 and preferably from about 2:1 to 6:1. In the preferred embodiment crude fiber in the form of skins and/or core materials which is generally removed by conventional processes is processed and added to the puree in effective amounts up to about 7.0 percent (dry basis) consistent with the foregoing composition or to adjust the puree to conform with the above compositional values.

In the preferred embodiment this puree is dried to form a continuum of material and may be dried in a special conditioning environment under controlled atmospheric conditions. Thereafter the dried product is further processed by flaking (if further flaking is required) and packaging same which is also preferably within the same conditioning environment.

More particularly it has been discovered that the addition of an effective amount of fruit skins and/or core materials to the puree, when subjected to drying processes, and even more particularly when drum dried under controlled atmospheric conditions, permits the formation of continuous films and/or sheets which are processed to produce a fruit product having remarkable resistance to thermal set, excellent shelf life, and reconstitutability to natural consistency, yet is free from extraneous binders, extenders, whiteners, inorganic additives and/or other undesirable additives.

THE DRAWING FIGURES

FIG. 1 is a comparison of shelf life test results of the dried products of Examples 3–8.

FIG. 2 is a comparison of shelf life test results of the dried products of Examples 9, 10, 11, 21, 22 and 23.

FIGS. 3A and 3B are the gradations of lumping characteristics shown in the shelf life test results set forth in FIGS. 1 and 2.

DETAILED DESCRIPTION OF THE PREFERRED EMBODIMENT

It will be understood that preparatory to drying the fresh fruit puree, which may consist of apples, pears, bananas, peaches, plums, combinations thereof and the like, the fresh fruit is washed, and sorted with only the select fruit is being passed on for further processing. The fruit utilized in the present invention is ripe or mature fruit which may or may not contain pits, stones, and the like. If the fruit is to be processed without adding back skins and/or core materials then it may be processed as is depicted and described in the '405 patented process, which patent, in its entirety, including the drawings, specificiation, examples and claims is incorporated herein by this reference.

In the preferred embodiment, the selected fruit is washed and steam-peeled with the skin being collected for further processing. The peeled fruit is then chopped or diced into cubes of between about one-quarter to one-half inches and includes for example, in the case of apples, pears, and the like, cores, seeds, and stems. The chopped product is thereafter heated in cook kettles in the manner set forth in more detail hereinbelow and double finished by passing the cooked chopped fruit through a pulper having screens of 0.060 and through a finisher having screens of about 0.033 inches whereby the double finishing removes the seeds and stems, forming the main stream puree. The collected skin is mixed with the portion of the main-stream puree, Rietz milled using screen sizes of about 0.033 to 0.027 inches or less whereupon the Reitz milled skin containing portion is added back to the main stream puree which can thereafter be dried. The percentage by weight of skins added is generally within the range of from about 3.0 to 8.0 percent wet weight basis however, as conditions vary, an effective amount of skins and/or core materials may be added to the main-stream puree, for example, to improve sheeting characteristics, compensate for high percentages of total sugars, and the like. In the instance the fruit contains stones, pits, and the like, the preferred mode of processing would include the removal of skins as above, heating of the whole skinless fruit to soften followed by the destoning of the fruit, double finishing of the destoned, cooked product and further processing as set forth above.

In still yet another embodiment, the selected and washed fruit is decored in, e.g., an Altman corer, (Altman Industries, Inc., Gray, Ga.), which separates the cores from the remaining skin containing meats, which meats are chopped then heated in cook kettles as above, and Rietz milled utilizing screens of about 0.033 inches or less, a portion of which is then mixed with the core materials which have been cooked in a sufficient amount of water and for sufficient times to soften the core materials. Prior to admixture of the core materials with the Rietz milled meats (main-stream puree), they are finished using about 0.027 inch screens for removal of seeds and stems, and then added back to the main-stream puree which is then ready for drying.

In the process as thus far described, prior to the product entering the cook kettle, which in the preferred embodiment is an open stainless steel kettle having a steam jacket to which pressurized steam is supplied for heating purposes, 25 gallons of filtered water and, preferably small quantities of organic acids (ascorbic and citric) are added to the cook kettle and brought to a boil. The amount of water selected is based upon the type of fruit processed and the batch weight of fruit, but generally is about a pound of filtered water to every 7.5 pounds of fresh fruit. In the case of heating the core materials, the amount of water utilized is based upon the type of core materials being processed and is generally from about one pound of filtered water to every 6.0 to 7.0 pounds of fresh fruit core materials. The acidulants can be utilized in both cases, and amounts utilized are generally from about 0.5 to 0.30 percent based upon raw product weight (wet batch). In the preferred embodiment, 13 ounces of ascorbic acid (vitamin-C) and about 6 ounces of citric acid are added to the 25 gallons of water utilized for the meats for fortification and to retard or prevent discoloration of the fruit. Lesser amounts are utilized in conjunction with the heating of the core materials, with an effective amount of ascorbic acid and/or citric acid being utilized in the same manner and for the same purposes as stated above with respect to the treatment of the fresh fruit meats. The fruit product or core material is then added to the boiling water containing the organic acids and then heated (about 200° F.) with agitation or stirring, to soften the fruit or core material. This is accomplished at the minimum permissible temperatures which will deactivate enzymes and destory certain microorganisms and/or create an environment which will not support microbial growth.

While applicant does not wish to be limited in any particular theoretical concept, it is believed that the foregoing type heating preserves the natural constitutents of the fruit without the reduction or alteration of the carbohydrates and more commonly the various saccharides which may for example, depending upon the fruit, include: monosaccharides such as fructose or glucose; disaccharides such as lactose, maltose and sucrose; reducing sugars; and polysaccharides such as cellulose, dextrins, hemicellulose, pectin, pentosans, and starch. The retention of these carbohydrate constitutents is herein included within the term referred to as the "integrity" of the fruit. If excessive heat is utilized, some of the natural di- and poly-saccharides are reduced to simple sugars. The resultant increase in these sugars is believed to be one of the factors causing difficulties in drying, including the drum drying of a natural fruit puree.

Other facts which are likewise thought to reduce difficulties in the drying of a natural fruit puree, include the selection and processing of ripe fruit in a manner which will yield a finished puree ready for drying wherein the feed solids, insoluble solids, ratio of total sugar to insoluble solids, percentage of total sugars, and ratio of total sugars to fructose, are within the ranges as fully set forth hereinbefore. These parameters will collectively be referred to as "puree parameters". The percentage feed solids is determined as bone dry solids by e.g. the vacuum oven or microwave methods as is known in the art. The percentage insoluble solids is determined by subtracting the amount of soluble solids from the total feed solids wherein the soluble solids were determined by conventional refractometer methods. The total sugars were determined by spectrophotometric methods and the percentages of individual sugars including fructose by analytic methods using high performance liquid chromatography. In the preferred embodiment the puree has an acidity of between from about 0.7 to 1.26 as determined by titration of acetic acid and a pH of from between 3.5 to 4.5 as determined by a Bechman pH meter. The percentage crude fiber was determined by AOAC Method 7.065, 13th Ed. of Association of Official Analytic Chemists.

The range of desirable total sugar content is determined by opposing constraints. Since sugar is hygroscopic, the higher the total sugar content, the more difficult it becomes to dry the puree. In contrast, the lower the total sugar content, the less desirable the organoleptic properties become. It has been discovered that when the total natural sugar content is greater than about 80 percent on a dry solids basis, the puree will not dry sufficiently to form a continuous sheet. It has also been found that the organoleptic properties are less than desirable when the total sugar content is less than 50 percent on a dry solids basis. Although the sugar content of fruit purees depend, among other things, on the type of fruit, maturity of fruit, and growing conditions, it has generally been found that when fruit purees have a total sugar content less than 50 percent, this indicates that the fruit was not mature before preparing the puree. Consequently, the total sugar content should be high enough to insure desirable organoleptic properties, yet below about 80% to allow adequate removal of moisture. Most specifically, it has been found that dryability and stability of fruit purees limit the total sugar content preferably to the range of about 50 to 70 percent.

In addition to the dependence on the total sugar content of the puree, the water-absorbing characteristic of the puree is also particularly dependent upon the total sugar content relative to the amount of insoluble solids, (to include crude fiber) in the puree. It has been discovered that the foregoing total sugar to insoluble solids ratios should most preferably be observed.

Furthermore, it has been discovered that the proportions of the various sugars in the total sugar mix may be material. The ratio of fructose to total sugar is related to the ability to dry the puree. When the total sugar content is greater than 80 percent, indicating that the fruit was either too ripe and/or was cooked too long in the preparation of the puree, the fructose level is usually greater than about 42 percent in the total sugar mix. Such a product will not ordinarily dry.

While the foregoing puree parameters are believed significant in terms of drying processes such as drum drying, they are presently believed to be applicable to other modes of drying. Also while the factors are discussed in the context of drum drying operations, applicant does not presently contemplate this as limiting such factors to this particular mode of drying unless so specified.

In yet another embodiment of the present invention, a finished puree having a composition consistent with the foregoing puree parameters has been achieved through the addition of natural fruit fiber to the initial fruit puree mixture. For example, if the initial puree mixture contains a sugar content which is too high, natural fruit fiber having a low sugar content, such as fruit skins and/or cores may be added to adjust the puree parameter to within the specified ranges. Although the skins and cores of the same fruit or fruits as in the puree are endogenous, it may be preferable to add such materials from exogenous fruits to achieve the desired results. Thus the present invention contemplates the addition of various fruit fibers in addition to those provided by the skins and/or cores being processed and can contemplate use of skins and/or core type materials generated by other processing operations. Generally an effective amount of added skins and/or core materials ranges from about 3.0 to 11.0 percent on a wet weight basis. The skins generally range from about 3.0 to 8.0 percent.

In the preferred embodiment, the drying of ready puree with added skin and optionally core materials, is then pumped into a covered holding tank or if not to be utilized within a short time after processing, is cooled and pumped into a cover holding tank as is set forth fully in '405 patented process.

In the preferred embodiment, the dehydration ready puree is passed from a covered hold tank to an evaporator which increases the total solids content to most preferably 26 to 32% by weight, and in the instance the dehydration ready puree is to be held prior to dehydration drying, it is still yet more preferable to evaporate the puree to about 26% solids by weight whereafter it may be diluted again to about from 18–22% solids by weight prior to drying.

In the preferred embodiment the evaporated, concentrated drying ready puree is metered onto a drum drier and dried and flaked as is also fully set forth in the '405 patented process as above-referenced.

As was seen from the examples from applicant's patent process the flaked product produced under the stated conditions of relative humidity and temperature produced remarkably low levels of moisture in the range from about 0 to 0.50% and certainly less then 1.0% moisture. As stated in the referenced patented process of applicant, the dried sheet when flaked and packaged, did not lump in the package under normal condition and was readily reconstitutable to natural consistency whereas pilot studies have indicated that wet or tacky sheets (greater than 2% moisture content) lump when flaked and packaged.

It is now been found, that the above product can be further improved insofar as temperature stability and/or resistance to thermal set when an effective amount of skins and/or core materials is added to the puree in the manner as set forth hereinbefore, prior to drying. Moreover, the additions of the skins and/or core materials resulting in unexpected high temperature properties and resistance to thermal set may permit, by their addition, suitable dried products notwithstanding moisture contents of greater than 1.0%. By the addition of effective amounts of skins and/or materials, it may be possible to produce for example, a flaked product having moisture contents in the range of less than about 2%, and more preferably less than about 1.5 percent not only having the desired shelf life stability and resistance to thermal set but additionally being free flowing, not prone to irreversible lumping and being readily reconstitutable to natural consistency.

Without being limited to the theory or mechanism stated, it is believed that by controlling the moisture content of the product, the formation of moisture related lumping, which is irreversible, is controlled. By controlling the ratio of the total sugar to insoluble solids and/or crude fiber content of the product, resistance to lumping caused by high temperature storage which may or may not be reversible, is controlled. Accordingly, the preferred embodiment controls lumping due to both moisture content and high temperature storage which is preferably controlled by drying, in an environment of cooling dehumidified air, a puree of specified composition (as set forth hereinbefore), and even more preferably, a puree containing added fruit skins and/or core materials.

It should be understood, that the following examples including comparative examples are provided to further illustrate the invention including the scope of the invention. The particular details thereof and those incorporated by reference are not to be regarded as limitations, as they may be varied as will be understood in reading this specification and is understood by one skilled in the art. The following materials are believed to establish the superior high temperature stability and resistance to thermal set of the products utilizing additions of effective amounts of skins and/or core materials, even as compared to the product produced by the '405 patented process.

I.

An apple paste was prepared in the same manner as set forth in the '405 patented process using a 3 to 1 mix of golden delicious and red variety wherein the paste was adjusted to 20.06% feed solids. Drying was attempted on a double drum dryer under atmospheric conditions. The puree composition was 82.41% total sugars, 4.78% insoluble solids, 17.2:1 total sugar to insoluble solids, and 1.7:1 total sugar to fructose all on a bone dry solid basis. No continuous sheet was formed which was believed to be in part due to the large percentage of total sugars.

II.

An apple paste was prepared as in Example 1 having 18.00% feed solids, and 69.22% total sugars and a total sugar to fructose ratio of 1.5:1. The puree was then double drum dried as in Example 1 without adding skins and/or core materials, it produced a continuous sheet, the flaked product for which having a finished moisture content of 1.79%. This product was packed in a moisture barrier in a controlled environment and held at ambient conditions. Within one month the product formed into an irreversible lump in its package—a hard solid mass as defined in the temperature stability trials, below.

III.-VIII.

The following purees with and without additions of skins and/or core materials were prepared in a manner consistent with the instant application and dried on a single drum dryer under controlled conditions of cooling dehumidified air at 70° F. (max) and relative humidities of 30% (max) consistent with the '405 patented process. The purees and processing parameters were as follows:

|  | III. | IV. | V. | VI. | VII. | VIII |
|---|---|---|---|---|---|---|
| Parameters | AP-1[1] | APC-1[2] | AP-1[3] | AP-1[4] | AP-1[5] | AP-1[6] |
| Feed Solids, % | 13.22 | 13.25 | 14.07 | 16.63 | 11.14 | 13.92 |
| Total Sugars, % (BDS) | 69.30 | 66.06 | 64.56 | 63.63 | 63.72 | 65.77 |
| Insoluble Solids, % (BDS) | 6.72 | 12.44 | 11.00 | 11.59 | 12.01 | 11.63 |
| Sugar to Insoluble (BDS) (ratio) | 10.3:1 | 5.3:1 | 5.7:1 | 5.5:1 | 5.3:1 | 5.6:1 |
| Total Sugar - to - Fructose (ratio) (BDS) | 1.80:1 | 1.60:1 | 1.70:1 | 1.70:1 | 1.70:1 | 1.80:1 |
| Sheeting Characteristic | continuous | continuous | continuous | continuous | continuous | continuous |
| Finished Moisture, % | 0.59 | 0.90 | 0.53 | 0.22 | 0.30 | 0.11 |
| Steam Pressure (PSIG) | 90–100 | 90–100 | 90–100 | 90–100 | 90–100 | 90–100 |
| Feed Rolls used | 2 | 2 | 2 | 2 | 2 | 2 |
| RMP | 1.5–2.5 | 1.5–2.5 | 1.5–2.5 | 1.5–2.5 | 1.5–2.5 | 1.5–2.5 |

-continued

|  | III. | IV. | V. | VI. | VII. | VIII |
|---|---|---|---|---|---|---|
| Batch Size (Gal) | 150 | 150 | 150 | 150 | 150 | 150 |

[1] Freshly prepared apple puree of single strength concentration using applicant's patented process.
[2] AP-1 which is concentrated to 30% solids by evaporation for storage, then diluted for dehydration drying.
[3] Pulper waste including skins, stems, seeds and core materials was mixed with a portion of the finished puree Reitz milled using .033 inch screens and then finished using .027 inch screens with these materials added back to the puree for drying. The skins amounted to about 3.0% (wet weight basis)
[4] Whole apple macerated using a Reitz mill having .033 inch screens with skins amounting to 4.0% (wet weight basis) and with seeds and stems removed by double finishing with .027 inch screens.
[5] Skins removed by steam peeling and Rietz milled (.033" screens) with 3.0% skins (wet weight basis) added back to finished puree.
[6] Apple cored, Rietz milled (.033" screens); double finished core materials are diced, heated, finished and added back to Rietzed main-stream puree. The crude fiber amounted to about 5.5% on a dry basis.

IX.–XI.

The following purees were prepared and dried as in trials III through VIII.

| Parameters | IX. | X. | XI. |
|---|---|---|---|
|  | BAP[7] | BAP[8] | BAP[9] |
| Feed Solids, % | 19.59 | 19.24 | 19.82 |
| Total Sugars, % (BDS) | 67.91 | 69.18 | 69.06 |
| Insoluble Solids, % (BDS) | 8.11 | 10.06 | 6.65 |
| Sugar to Insoluble (BDS) (ratio) | 8.40:1 | 6.90:1 | 10.38:1 |
| Total Sugar - to - Fructose (ratio) | 2.0:1 | 2.3:1 | 2.35:1 |
| Sheeting Characteristics | continuous | continuous | continuous |
| Finished Moisture, % | 0.15 | 0.44 | 0.69 |
| Steam Pressure (PSIG) | 110 | 110 | 110 |
| Feed Rolls used | 2 | 2–3 | 2–3 |
| RMP | 1.5–2.3 | 1.5–2.3 | 1.5–2.3 |
| Batch Size (Gal) | 115 gal. | 165 gal. | 170 gal. |

[7] Bananas, apple, peach puree comprising 43.0% bananas, 41.0% apples, and 16.0% peaches was prepared as in applicant's patented process to which about 1.5% apple skins was added to the finished puree based on the apple portion.
[8] 9.6% pulper waste comprising mostly skins was Rietz milled using 0.33 inch screens, finished (.027" screens), and then added to the main-stream puree.
[9] Puree prepared as in 7. without added skins or core materials.

XII.–XV.

The following purees were prepared and dried as in Trials III through VIII.

|  | XII. | XIII. | XIV. | XV. |
|---|---|---|---|---|
| Recipe | AP-1*,[1] | APC-1*,[2] | AP-1*,[3] | AP-1*,[4] |
| Sheet Formation | continuous | continuous | continuous | continuous |
| Puree (Before Drying), % Feed Solids | 13.22 | 13.25 | 14.07 | 16.63 |
| Insoluble Solids/(BDS) | 6.72 | 12.44 | 11.00 | 11.59 |
| Finished Moisture, % | 0.59 | 0.90 | 0.53 | 0.22 |
| Sugar - to - Insoluble ratio (BDS) | 12.90:1 | 6.67:1 | 8.70:1 | 5.49:1 |
| Sugar Profiles (BDS) |  |  |  |  |
| Fructose, % | 38.80 | 40.67 | 38.93 | 37.67 |
| Glucose, % | 17.95 | 17.06 | 19.57 | 19.54 |
| Sucrose, % | 12.97 | 8.33 | 6.06 | 6.42 |
| Total Sugar, % | 69.72 | 66.06 | 64.56 | 63.63 |

*See same noted definitions used in prior examples.

XVI–XIX

The following purees are prepared and dried as in Trials III through VIII.

|  | XVI. | XVII. | XVIII. | XIX. |
|---|---|---|---|---|
| Recipe | AP-1*,[5] | AP-1*,[6] | FPRC-1[10] | FPRC-S1[11] |
| Sheet Formation | continuous | continuous | continuous | continuous |
| Puree (Before Drying), % Feed Solids | 11.14 | 13.92 | 18.46 | 17.86 |
| Insoluble Solids/(BDS) | 12.01 | 11.63 | 18.17 | 11.24 |
| Finished Moisture, % | 0.30 | 0.11 | 0.57 | 0.66 |
| Sugar - to Insoluble Solids Ratio (BDS) | 7.92:1 | 6.77:1 | 3.01:1 | 5.49:1 |
| Sugar Profile (BDS) |  |  |  |  |
| Fructose, % | 36.55 | 36.46 | 32.80 | 35.96 |
| Glucose, % | 18.21 | 17.52 | 24.40 | 26.99 |
| Sucrose, % | 8.96 | 11.79 | 3.54 | 3.33 |
| Total Sugar, % | 63.72 | 65.77 | 60.74 | 66.28 |

*See same noted definitions used in prior examples.
[10] Fresh pears prepared as in applicant's patented process, evaporated to 30% concentration, and then diluted prior to drying.
[11] Fresh pears with skins retained, was concentrated, stored, diluted and drum dried. The skins amounted to 3.0% wet weight basis.

XX–XXI

The following purees were prepared and dried as in Trials III through VIII.

|  | XX. | XXI. |
| --- | --- | --- |
| Recipe | PRC-1[12] | BA[13] |
| Sheet Formation | Yes | Yes |
| Environment | Control | Control |
| Puree (Before Drying) | 18.78 | 19.35 |
| Insoluble Solids % (BDS) | 13.72 | 8.51 |
| Finished Moisture, % | 0.60 | 1.10 |
| Sugar-to-Insoluble Solids Ratio (BDS) | 4.25:1 | 7.32:1 |
| Sugar Profile (BDS) | | |
| Fructose, % | 40.16 | 33.31 |
| Glucose, % | 19.09 | 23.05 |
| Sucrose, % | 6.71 | 16.07 |
| Total Sugar % | 65.96 | 72.44 |

[12]Fresh pear puree was prepared, skins removed and then evaporated to 30% solids, packed in Scholle bag and then diluted prior to drying.
[13]Banana apple puree was prepared and processed as in the '405 patented process.

XXII-XXIII

The following purees were prepared and dried as in Trials III through VIII.

|  | XXII | XXIII |
| --- | --- | --- |
| Recipe | BA[14] | BA[15] |
| Sheet Formation | Yes | Yes |
| Environment | Control | Control |
| Puree (Before Drying), % Feed Solids | 18.18 | 16.76 |
| Insoluble Solids, % (BDS) | 10.34 | 9.47 |
| Finished Moisture, % | 0.21 | 0.82 |
| Sugar to Insoluble Solids Ratio (BDS) | 6.70:1 | 7.5:1 |
| Sugar Profiles (BDS) | | |
| Fructose, % | 40.74 | 34.80 |
| Glucose, % | 27.37 | 25.23 |
| Sucrose, % | 1.54 | 10.95 |
| Total Sugar, % | 69.66 | 70.98 |

[14]The pulper waste was Reitz milled (.033" mixed with main-stream puree and finished .027"). The finished puree contained 8.24% of finished pulper waste (wet weight basis).
[15]Banana apple puree was processed as in footnote 4, supra, prior to drying.

HIGH TEMPERATURE STABILITY

The dehydrated fruit product from the foregoing trials all flaked and packed in foil-lined composite canisters under the same controlled temperature and humidity environment as specified for drying. Packaged samples for each of the specified trials were stored individually on shelves under ambient conditions (72° to 80° F.) to simulate the normal distribution environment and elevated temperatures of 98° F. to reflect accelerated shelf life studies. These studies were implemented to evaluate high temperature stability and resistance to thermal set. Each product was evaluated on a monthly basis with the results graphically depicted tri-monthly. As shown, the testing to date covers 21 months of the total 24-month shelf life test cycle. After each product has been subjected to the selected storage variables for the chosen time intervals, it is tested for lumping characteristics. The lumping characteristics are graded over 11 gradations as shown in FIGS. 3A and 3B. Gradations 1 through 9 will reconstitute readily in water, but the reconstitution of gradations 10 and 11 is retarded because of form. However, upon standing in water, gradations 10 and 11 will reconstitute in water.

XXIV

Dried products of trials III though VI were packaged and shelf life tested as set forth hereinabove. Trial IV was graded after 9 months of shelf storage whereas the remaining trials were graded after one year of shelf like storage. The results are shown in FIG. 1.

The foregoing test results are believed indicative of the fact that the addition of skins and/or pulper waste of from about 3 to 8% skins with up to about 10% skins and core materials combined, provide a high temperature stable product which is resistant to irreversible thermal caking and thermal degradation; whereas the product as in trials III and IV not only performed unexpectedly worse than did the product containing added skins and/or core materials, but when subjected to accelerated thermal aging at 98° F. produced a non-functional hard and flaky product not resistant to thermal set.

XXV

Dried products of trials IX through XI and XXI through XXIII were shelf life tested as in XXIV above. These results are as shown in FIG. 2. The foregoing examples likewise indicate an unexpected high temperature stability and resistance to thermal set upon addition of skins and/or core materials. In particular, the mixed fruit combination of the control (IX) was drastically improved by the addition of apple skins and skins and/or core materials from the pulper waste in trials IX and X, respectively. Trial IX is believed to clearly show that, under high temperature conditions the mixed fruit product is non-functional after the twelve month shelf life test and the apparent improvement during the 15 to 18 month interval is believed due to sample variation since the testing done to date has failed to indicate any trends showing an improvement after irreversible lumping occurs.

As is used herein, the term functional is used to designate a product which exhibits free-flow characteristics of the flakes from its container by pouring or spooning with or without first probing the product to break lumps to form the original flakes. Conversely, a non-functional product is not resistant to thermal set and consequently, the product will not return to its original free flowing form.

The present invention, its modus operande, and many of the advantages attended thereto should be readily understood from the foregoing without further description. While the preferred embodiment and examples of the present invention have been shown and described for illustrative purposes, it is nevertheless capable of variation within the purview of the invention as defined by the appended claims.

What is claimed is:

1. An unadulterated free-flowing dried, pulped and finished fruit puree product in the form of flakes, which is readily reconstitutable to natural consistency, said dried product being resistant to thermal set, consisting essentially of a homogeneous mixture containing from about 3.0 to about 7.0 percent dry weight of finished crude fruit fibers selected from the group consisting of fruit skins, fruit core materials free of seeds and pits, and mixtures thereof, and the balance fruit meats, having not more than about 80.0 percent by weight total sugars, and the ratio of total sugar content to insoluble solids being within the range of from about 5:1 to 13:1.

2. The product of claim 1, wherein said ratio of total sugars to fructose of saaid dried product ranges from between about 1.5:1 to 6.0:1.

3. The product of claim 2, wherein said dried product has a moisture content of not more than about 1.5 percent.

4. The product of claims 3, wherein said fresh fruit is selected from the group consisting of apples, pears, peaches, bananas and mixtures thereof.

5. The product of claim 4, wherein said product has from about 6.0 to 8.0 dry weight percent insoluble solids.

* * * * *